United States Patent [19]
D'Anniballe et al.

[11] Patent Number: 6,112,983
[45] Date of Patent: Sep. 5, 2000

[54] ENHANCED NETWORK MONITOR SYSTEM FOR AUTOMATED BANKING MACHINES

[75] Inventors: Craig W. D'Anniballe, North Lawrence, Ohio; Tom Stewart, Charlotte, N.C.; Terry Patterson, Canton, Ohio

[73] Assignee: Diebold, Incorporated, North Canton, Ohio

[21] Appl. No.: 09/062,207

[22] Filed: Apr. 17, 1998

Related U.S. Application Data

[60] Provisional application No. 60/065,081, Nov. 10, 1997.

[51] Int. Cl.[7] ................................... G06F 17/60
[52] U.S. Cl. ........................... 235/379; 902/39
[58] Field of Search .................. 235/379; 902/37, 902/39; 705/35, 39, 42, 43

[56] References Cited

U.S. PATENT DOCUMENTS

| | | | |
|---|---|---|---|
| 4,621,326 | 11/1986 | Rawlins | 364/408 |
| 4,636,947 | 1/1987 | Ward | 364/200 |
| 4,660,168 | 4/1987 | Grant et al. | 364/900 |
| 4,823,304 | 4/1989 | Frantz et al. | 364/900 |
| 5,404,562 | 4/1995 | Heller et al. | 395/800 |
| 5,790,804 | 8/1998 | Osborne | 395/200.75 |
| 5,864,738 | 1/1999 | Kessler et al. | 395/200.69 |
| 6,002,767 | 12/1999 | Kramer | 380/24 |

*Primary Examiner*—Karl D. Frech
*Attorney, Agent, or Firm*—Ralph E. Jocke; Christopher L. Parmelee

[57] ABSTRACT

An enhanced network monitor system (30) processes event messages and command response messages from automated banking machines such as ATM terminals (36). Both message types are assigned a single transaction code. The system includes an application program (34) in which the event messages and command response messages are processed in a host computer by parallel message processing regions (52, 54, 56). A modified VTAM communications protocol enables the application to control sequencing of messages generated by the ATM terminals. This enables both event messages and command response messages to be run in a response mode. The transaction processing limit for the parallel message processing regions may be set to a maximum value. The parallel message processing regions run the single transaction repeatedly without reloading which increases the rate at which messages are handled.

17 Claims, 2 Drawing Sheets

ENHANCED NETWORK MONITOR SYSTEM FOR AUTOMATED BANKING MACHINES

This application claims the benefit of U.S. Provisional application(s) No(s).: 60/065,081 Filing Date Nov. 10, 1997.

TECHNICAL FIELD

This invention relates to automated banking machines. Specifically, this invention relates to a system in which messages between automated banking machines and a host computer are handled reliably and more rapidly.

BACKGROUND ART

Automated banking machines are known in the prior art. Automated banking machines include various devices which execute transactions having financial consequences for the user or operator. Such machines may include for example credit card payment terminals, point of sale terminals, automated ticket vending terminals, automated vending machines, automated bill payment terminals, stored value card terminals, scrip dispensing terminals, coupon or stamp dispensing terminals, travelers check dispensing and/or cashing terminals, coin or token dispensing terminals, and other devices which perform similar functions.

A popular type of automated banking machine is an automated teller machine (ATM). ATMs may be used by customers to conduct banking transactions. Such banking transactions may include receiving cash, making deposits, transferring finds between accounts and other types of financial transactions. Some ATMs perform only one type of transaction while others may be used to perform several types of transactions. Common types of commercially available ATMs include machines that are available from Diebold, Incorporated such as Model 1072ix and other models in the 1070 i Series and ix Series (hereinafter referred to as Diebold machines). Other ATMs are available from IBM such as the models in the 4730 series and 4780 series (hereinafter referred to as 473X and 478X, respectively).

A common way of operating ATMs and other automated banking machines is from a host computer. The machines communicate through messages exchanged with the host computer through various types of communications links or networks. The messages that are used by the ATMs to communicate have various protocols and message formats that have been defined by manufacturers of ATMs and/or operators of the communications networks. For example, IBM has defined certain protocols and message formats for use with its 473X machines. Diebold, Incorporated has defined certain protocols and message formats which are used in connection with its machines. Of course, the protocols and formats used in connection with ATMs are programmable features that may be changed to suit a particular systems environment.

Host systems that are used to operate ATMs commonly include operating systems and application environments that are provided by IBM, or which are IBM compatible. Application programs which operate the ATMs operate in these host systems environments. Common host system environments in which application programs are run include, for example, MVS/IMS; MVS/CICS; and VSE/CICS. Of course, in other host systems other software environments may be used. Common programming languages used in these software environments include, for example, VS Cobol 2 and Cobol 370.

In the operation of ATMs, several types of messages are passed back and forth between the host and the ATM terminal. These messages include information representative of the transaction type, the terminal, the identity of the customer operating the terminal, the customer's accounts and other information. Such information may be obtained or resolved from data stored in the terminal, data encoded on a card input to the terminal by the customer and/or information that is otherwise input by a customer to the terminal such as through function keys or a keypad. Other messages are commands which are sent by the host to the terminal and which cause the terminal to execute functions. In response to receipt of a command message, the terminal often generates a command response message back to the host. Generally the command response message indicates that the command was (or was not) successfully executed.

ATMs and other types of automated banking machines also send other types of messages to the host which are indicative of events which have occurred at the terminal. Such messages will be sent whenever the event occurs at the terminal. An example of an event may be that the terminal senses that it is low on currency. In response to sensing this condition the terminal sends an event message indicative of the condition to the host. Other event messages may indicate other events, such as the terminal is low on receipt paper or that a service person is accessing the terminal. Of course, there are many types of event messages which terminals may generate depending on the nature of the terminal and its programming.

A limitation of the current host based automated banking machine systems is the manner in which event and command response messages are handled. Conventional systems configurations require that event and command response messages be processed in a way that limits transaction processing rates. Further, if conventional methods are employed to increase transaction rates, the reliability of the system may be substantially degraded.

An example of a prior art configuration for a host based ATM transaction processing system is shown in FIG. 1. In this prior art system generally indicated 10, there is a host computer schematically indicated 12. For purposes of this example the host computer has an MVS/IMS operating environment. However, it should be understood that in other systems other software environments are used. Operating in the host computer 12 in the IMS environment is an application program schematically indicated 14. This application program is a software program for operating ATMs such as IBM Personal Banking Machine Network Monitor 2.5.

A plurality of ATMs 16 are connected to the host 12 through a communications link 18. The communications link may be a network or other suitable communications medium for ATM messages. For purposes of this example, the ATM terminals are indicated as being IBM 473X machines.

The host 12 is also connected to other work stations schematically indicated 20. The work stations are terminal devices which are not ATMs. For example, work stations 20 may be input/output terminals that are used by individuals that monitor and control the operation of the system 10. Work stations 20 are connected to the host 12 by a communications link 22. Communications link 22 may be common with communications link 18 or may be a totally separate communications path.

In prior art systems the event messages and command response messages from the ATMs are handled in a single message processing region (MPR) in the IMS application. This message processing region which is schematically indicated 24 in FIG. 1, operates under IMS. MPR 24 operates in the serial mode and processes the event messages and command response messages that come to the host from the ATMs.

The work stations 20 communicate with a second message processing region, (MPR) which is schematically indicated 26 in FIG. 1. MPR 26 handles all remaining serial mode transactions that do not communicate with ATM terminals.

In the prior art system one transaction code is used for event messages. A different transaction code is used for command response messages. The transaction codes associated with the event and command response messages are in a class that routes them to MPR 24. The event transaction runs in an IMS response mode while the command response transaction runs in an IMS non-response mode. The priority level for the command response transaction code is conventionally required to be set higher than the priority for the event transaction code. The event and command response transactions are further required to be defined as serial, and the processing limit count for the event and command response transactions is generally maintained at one.

All of these rules are conventionally followed in current systems to ensure message integrity and processing of messages in the correct sequence when running in the required serial mode of operation. This is because the event messages can be generated from the ATM at any time the event condition occurs. This means that an event message may be generated after an ATM receives a command message and before the ATM generates its corresponding command response message. A failure to follow the rules may result in messages being processed in an incorrect sequence. This could result in system degradation to the extent of start up failures or generation of inaccurate systems operation data.

When the rules and conventions are followed, only one event message or command response message can be processed by MPR 24 at a time. As a result, other messages must be placed in a wait state or in a queue until the processing of the first message has been fully completed. Thereafter each single message must be processed individually in a similar manner. Following the rules maintains system reliability and integrity but undesirably limits the speed of operation.

Thus, there exists a need for an enhanced network monitoring system for handling ATM and other automated banking machine messages at increased rates and with a high level of reliability.

DISCLOSURE OF INVENTION

It is an object of the present invention to provide an enhanced network monitor system for operating automated banking machines.

It is a further object of the present invention to provide an enhanced network monitor system for operating automated banking machines that processes transactions at higher rates.

It is a further object of the present invention to provide an enhanced network monitor system for automated banking machines that maintains high reliability and integrity at increased transaction rates.

It is a further object of the present invention to provide a method of operating an enhanced network monitor system for automated banking machines.

It is a further object of the present invention to provide an automated banking machine that may be used in connection with an enhanced network monitor system.

It is a further object of the present invention to provide an automated banking machine that may be operated in connection with both a conventional network monitor system and the enhanced network monitor system of the invention.

It is a further object of the present invention to provide a method for operating an automated banking machine as part of an enhanced network monitor system.

It is a further object of the present invention to provide a method for modifying an automated banking machine to enable operation in connection with the enhanced network monitor system of the invention.

Further objects of the present invention will be made apparent in the following Best Modes for Carrying Out Invention and the appended claims.

The foregoing objects are accomplished by an enhanced network monitor system. This system includes an application operating in a host computer. The application includes a at least one parallel message processing region. The system includes automated banking machines such as ATMs which present event messages and command response messages having a single transaction code. The messages may be processed by any one of the parallel message processing regions in the host. The ATMs are configured to communicate in a manner which enables the host to control the sequence of messages including when event messages may be transmitted by the ATM. This enables event messages and command response messages to be processed more quickly and increases reliability by preventing messages from being handled in an improper sequence.

BEST MODES FOR CARRYING OUT INVENTION

Figure 2:
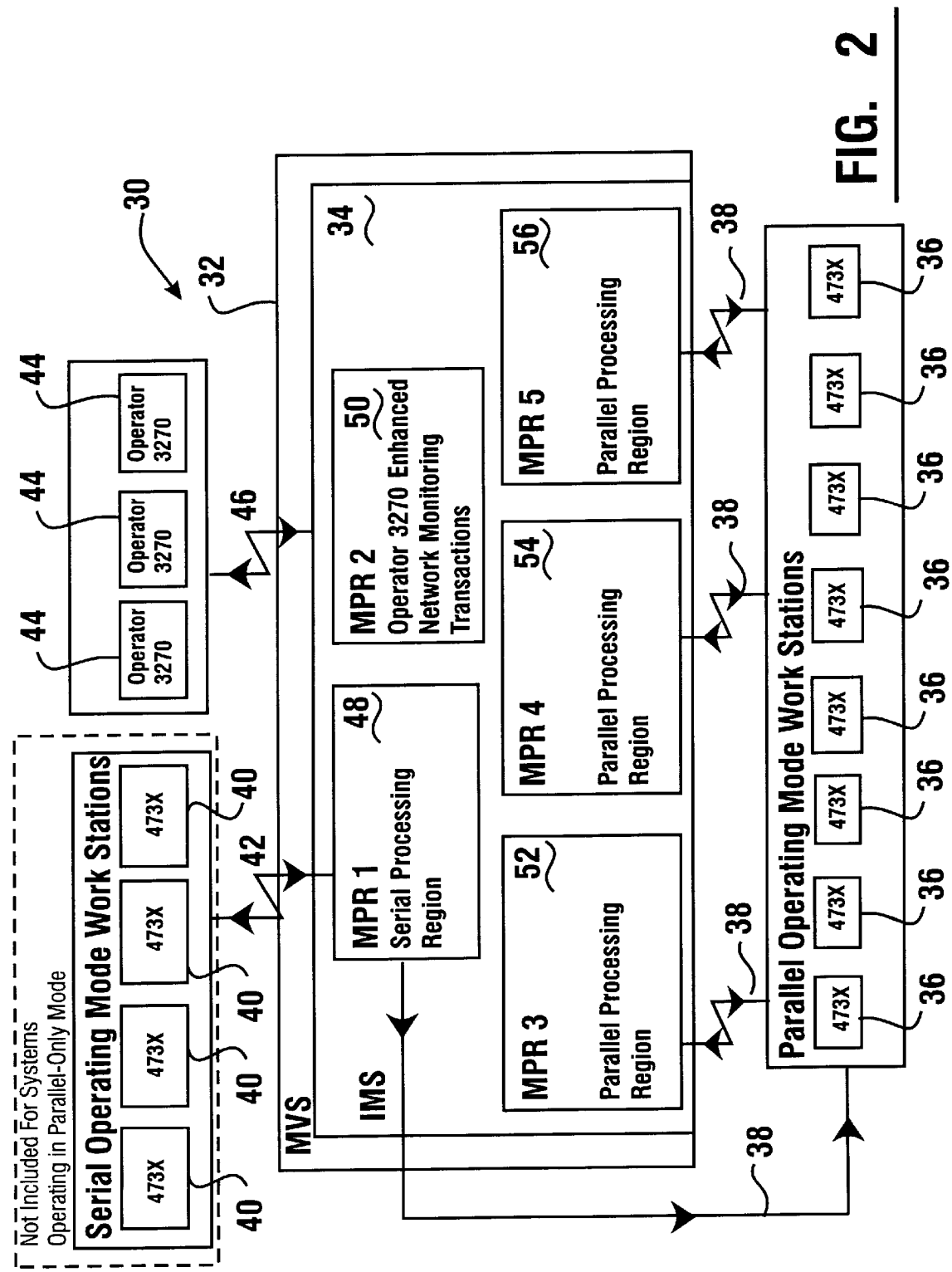
FIG. 2 is a schematic view of an exemplary embodiment of an enhanced network monitor system of the present invention.

Referring now the drawings and particularly to FIG. 2, there is shown therein a schematic view of an enhanced network monitor system of the present invention generally indicated 30. The system includes a host computer schematically indicated 32. As schematically indicated the host operates an MVS/IMS software environment. However, it should be understood that the present invention may be used in connection with other software environments including, for example, MVS/CICS and VSE/CICS. An application program schematically indicated 34 which includes certain novel aspects of the present invention operates in the IMS environment in the host.

A plurality of ATMs 36 are operatively connected to the host in the system. The ATMs 36 are connected to the host through one or more communications links, schematically indicated 38. It should be understood that communications links 38 include any suitable means for communicating messages between the host and the various ATMs. In this example, ATMs 36 are IBM Model 473X machines. Of course, in other embodiments other types of ATMs may be used, including Diebold machines, or other types of automated banking machines.

Figure 1:
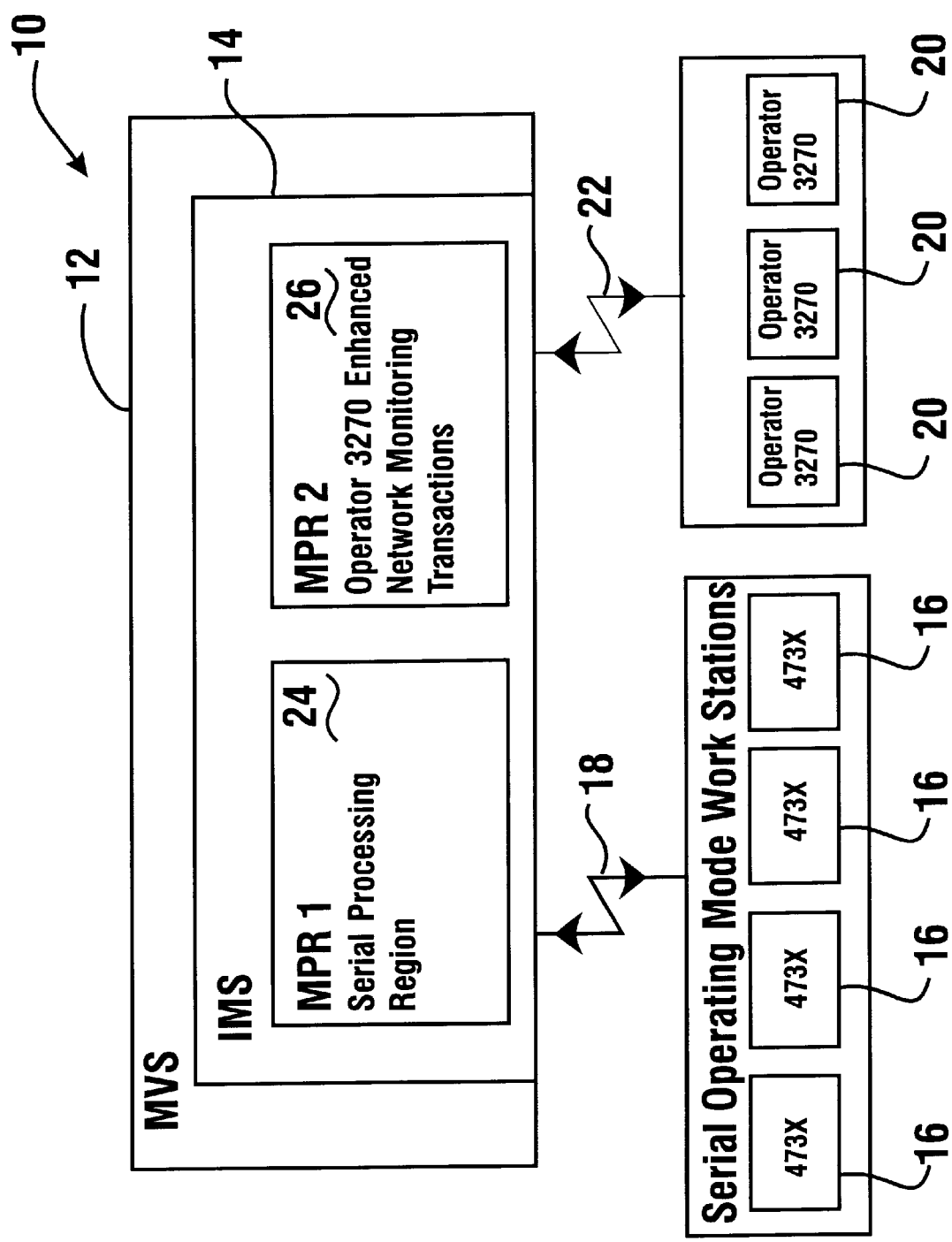
FIG. 1 is a schematic view of a prior art network monitoring system including a host computer which operates ATMs which system has been previously discussed.

In the exemplary embodiment of the system shown in FIG. 2, there is also shown a plurality of ATMs 40 operatively connected to the host. ATMs 40 schematically represent ATMs that operate in accordance with the teachings of the prior art discussed in connection with FIG. 1. The preferred embodiment of the present invention may also include ATMs or other types of automated banking machines which operate in the manner of the prior art. However, it should be understood that the system of the present invention need not include such machines. ATMs 40 communicate with the host through a communications link schematically indicated 42. It should be understood that communications link 42 may be a separate link or may be the same communications link 38 used by ATMs 36.

The exemplary system schematically indicated in FIG. 2 further includes work stations 44. Work stations 44 are similar to work stations 20 previously described in connection with FIG. 1. Work stations 44 communicate with the host through a communications link 46. It should be understood that communications link 46 may be the same communications link that is used by ATMs 40 and/or ATMs 36, or may be a separate communications link.

Application 34 includes a first serial message processing region (MPR) generally indicated 48. MPR 48 is similar to MPR 24 in FIG. 1. Application program 34 also includes a second MPR which operates as a serial message processing region generally indicated 50 in FIG. 2. MPR 50 operates in a manner similar to MPR 26 in FIG. 1.

Application program 34 includes MPRs which operate as parallel message processing regions designated 52, 54 and 56. It should be understood that while three parallel message processing regions are shown in FIG. 2, embodiments of the system may include any number of such parallel message processing regions.

ATMs 36 which are in operative connection with the parallel message processing regions use a novel communications protocol. Use of this protocol facilitates the processing of messages and speeds transaction flows. Each ATM 36 is configured so that both event messages and command response messages are output by the ATM as a single common transaction code. This enables the messages to be processed in any of the parallel message processing regions. This new single transaction runs in an IMS response mode which keeps the communications level consistent. This transaction is defined as parallel to IMS. The IMS parallel mode of operation enables event message and command response message processing to be done by any of the parallel message processing regions 52, 54 and 56.

In the preferred configuration of the present invention, the IMS parallel message processing regions may all process messages at the same time. In some embodiments it may be desirable to have as many parallel processing regions as there are automated banking machine terminals connected to the system. If this approach is taken, each parallel message processing region can handle event messages and command response messages from one automated banking machine. Each parallel MPR will work simultaneously with the others. Each message may be processed immediately with no queuing being done. In other embodiments the system may be configured to include queuing of messages being delivered to a parallel message processing region. The permissible size of the queue before transactions are scheduled into the queue of another parallel message processing region is optimally set to make each running message processing region do the greatest amount of work while not slowing transaction rates.

ATMs 36 in the exemplary system shown preferably communicate with host 32 using a VTAM communications protocol. However, for terminals 36 the protocol is preferably modified in accordance with the invention to achieve improved message sequencing.

In accordance with a conventional VTAM protocol, brackets are used to indicate where a unit of work starts and stops in relation to message traffic that goes to and from an ATM or other terminal. A begin bracket (BB) indicates the beginning of a unit of work. An end bracket (EB) signifies the end of a unit of work. A terminal that is operating using the VTAM protocol which sees a BB indicator is prevented from sending out a next message until it sees an EB indicator. It is only after the terminal has seen an EB indicator is it then free to transmit a subsequent message.

The following example shows how the VTAM bracketing appears in the operation of an IBM 473X ATM as it is conventionally operated.

| ATM | Host (Network Monitor) |
|---|---|
| Event | --BB----> |
|  | <-EB----Event Response |
|  | <-BB/EB---Command |
| Command Response | --BB/EB--> |
| Event | --BB----> |

As can be seen from the foregoing illustration, as soon as the EB is sent out of the ATM with the command response, the ATM is able to send the next event message to the host. This may result in two messages being sent to the host from the same terminal at the same time. However, those messages often must be processed in a correct sequence for the ATM to operate properly. It is this requirement that in the past dictates that IMS processing to be done in a serial mode of operation.

The preferred embodiment of the present invention overcomes this problem by preventing the automated banking machine from sending out an end bracket (EB) on its command response messages. Rather, in this example the application 34 sends a message back to the ATM that includes the EB. By stopping the ATM from sending out the EB as part of a command response message, the ATM is prevented from sending an event message until the host indicates that it is ready for it. By having the host send the EB back to the ATM, the host controls the message flow.

The following table shows the VTAM brackets used in the messages that pass between the host 32 and an ATM 36 in an example of the preferred form of the invention.

| ATM | Host (Enhanced Network Monitor) |
|---|---|
| Event | --BB----> |
|  | <-EB----Event Response |
|  | <-BB/EB---Command |
| Command Response | --BB----> |
|  | <-EB----Host Message |
|  | (to End Bracket State) |
| Event | --BB----> |

As schematically shown above, the command response message sent by the ATM does not have an EB with it. Rather, the host controls the transmission of the EB by sending its next message which serves as an end message. This stops the ATM from sending a next event message to the host until the host is ready. This approach frees the host from many of the restrictions which mandated a serial environment in the prior art.

The modification of the ATMs 36 to implement this modified VTAM protocol is preferably accomplished through a program change in the terminal microcode. This is done in the exemplary embodiment by downline loading a software change to each ATM from the host. Of course, the application program 34 is also written to employ the modified VTAM protocol.

In operation of the system, ATMs 36 transmit their event and command response messages to the parallel message processing regions 52, 54 and 56. It should be noted that the IBM 473X ATMs communicate some messages other than event messages and command response messages in a manner that requires serial processing. Therefore ATMs 36 continue to communicate with MPR 48 as shown. When other types of ATMs or automated banking machines are used, communication through MPR 48 may not be required.

Event and command response messages from ATMs 36 are all communicated to the parallel message processing regions 52, 54 and 56. Because all of these MPRs may work on the ATM event and command response transactions at the same time, the transaction throughput is increased compared to prior systems. The preferred embodiment of the system also takes advantage of the parallel message processing regions running the same transaction over and over again. Unlike prior art systems in which the processing limit count for each transaction was set to one, in the invention the transaction limit count for the parallel processing regions is set to the maximum value which in most cases is 65,535. This means that the transaction can be run 65,535 times without reloading into the IMS message processing region. This greatly increases the rate that transactions are handled compared to prior art systems.

A further advantage of the preferred embodiment of the present invention is that it can also accommodate ATMs and other automated banking machines which do not implement the modifications to the VTAM protocol to enable parallel processing of event messages and command response messages. As represented by ATMs 40, such terminals may continue to communicate with the serial message processing region 48. The fact that terminals which operate in a serial mode are run by application 34 does not impede the transaction speed of ATMs 36 which are operated in the parallel mode.

In one preferred embodiment of the invention which is used in connection with IBM 473X ATMs or Diebold ATMs, the necessary changes to implement use of the modified VTAM protocol are achieved by triggering a software switch within the terminal. This switch is preferably selectively actuated from the enhanced network monitor application program in the host. This enables ATMs to be upgraded from the serial processing mode to the parallel processing mode selectively and at a lower cost.

As can be appreciated from the foregoing discussion, the preferred embodiment of the present invention is an enhanced network monitor system that speeds the processing of automated banking machine transactions while maintaining a high level of reliability. The preferred form of the invention is economical to implement and achieves beneficial results without requiring the use of additional hardware in the system or costly modifications to the terminals. The principles of the invention may also be applied to other types of devices and systems which communicate event and command messages, and respective response messages thereto.

Thus, the new enhanced network monitor system for automated banking machines of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations given herein are by way of examples and the invention is not limited to the exact details shown or described.

In the following claims, any feature described as a means for performing a function shall be construed as encompassing any means known to those skilled in the art as being capable of performing the recited function and not mere equivalents of the particular means shown performing the function in the foregoing description.

Having described the features, discoveries and principles of the invention, the manner in which it is constructed, operated and utilized, and the advantages and useful results attained; the new and useful structures, devices, elements, arrangements, parts, combinations, systems, equipment, operations, methods and relationships are set forth in the appended claims.

We claim:

1. A system comprising:
an automated banking machine, wherein the machine is operative to generate at least one electronic event message responsive to an event occurring at the machine, and wherein the machine is operative to generate an electronic command response message responsive to an electronic command message received by the machine, wherein the event message and the command response message are adapted to be received by a host computer, and wherein the event message and the command response message each include transaction codes, wherein the transaction codes are operative to address the messages to message processing regions in the host computer, and wherein the event message and the command response message each include a common transaction code.

2. The system according to claim 1 and further comprising:
a host computer, wherein the host computer is in operative communication with the banking machine, and wherein the host computer is operative to issue the command message to the machine and to receive the event message and the command response message, and wherein the host computer includes at least one parallel message processing region operating therein, and wherein the event message and the command response message are processed by the parallel message processing region.

3. The system according to claim 2 wherein the command message received by the banking machine from the host computer includes a beginning indicator and an ending indicator, and wherein the command response message generated by the machine includes only the beginning indicator, and wherein the host computer is operative responsive to receipt of the command response message to generate an end message including the ending indicator.

4. The system according to claim 3 wherein the banking machine and host computer generally communicate in a VTAM protocol and wherein the beginning indicator is a begin bracket (BB) and the ending indicator is an end bracket (EB).

5. The system according to claim 1 wherein the banking machine is operative to generate a plurality of event messages, wherein each event message corresponds to one of a plurality of events occurring at the banking machine and is generated responsive to occurrence of its corresponding event, and wherein the banking machine is further operative to receive a plurality of command messages and to generate a plurality of response messages responsive to the command messages, and wherein each command response message corresponds to one of the command messages, and wherein each event message and each command response message includes the common transaction code.

6. The system according to claim 5 and further comprising a host computer, wherein the host computer is in operative communication with the banking machine, and wherein the host computer is operative to issue the command messages to the machine and to receive the event messages and the command response messages, and wherein the host computer includes a plurality of parallel message processing regions operating therein, and wherein each one of the plurality of parallel message processing regions are enabled to process each of the plurality of event messages and each of the plurality of command response messages.

7. The system according to claim 1 wherein the command message received by the banking machine includes a beginning indicator and an ending indicator, and wherein the command response message generated by the machine includes only the beginning indicator.

8. A system comprising a host computer; and an automated banking machine in operative communication with the host computer, wherein the banking machine is operative to issue an event message to the host computer responsive to an event occurring at the banking machine, and wherein the host computer is operative to issue a command message to the banking machine, and the banking machine is operative to issue a command response message to the host computer responsive to the command message from the host computer, and wherein the host computer is operative to issue an end message to the banking machine responsive to the command response message from the banking machine, wherein when the event occurs after the banking machine issues the command response message and before the banking machine receives the end message responsive thereto, the banking machine is operative to defer issuing the event message until the end message has been received.

9. A system according to claim 8 wherein the host computer includes at least one parallel message processing region operating therein, and wherein the event message and the command response message are processed by the parallel message processing region.

10. A system according to claim 9 wherein the command message received by the banking machine includes a beginning indicator and an ending indicator, and wherein the command response message issued by the banking machine includes a beginning indicator and does not include an ending indicator.

11. A system according to claim 10 wherein the end message issued by the host computer includes an ending indicator.

12. A system according to claim 9 wherein the event message and the command response message each include a common transaction code.

13. A method of operation of a system including at least one automated banking machine and a host computer in communication with the banking machine, comprising the steps of:

a) generating with the host computer a command message to the banking machine;

b) generating with the banking machine responsive to the command message, a command response message to the computer;

c) generating with the host computer responsive to the command response message, an end message to the banking machine;

d) generating with the banking machine responsive to occurrence of an event at the banking machine, an event message to the host computer, wherein when the event occurs between steps (b) and (c) the banking machine defers generating the event message until after step (c).

14. The method according to claim 13 wherein the command response message generated in step (b) and the event message generated in step (d) each include a common transaction code.

15. The method according to claim 13 wherein the host computer includes at least one parallel message processing region operating therein, and further comprising the step of:

e) processing the command response message generated in step (b) and the event message generated in step (d) in the at least one parallel message processing region.

16. The method according to claim 13 wherein the command response message generated in step (b) includes a beginning indicator and not an ending indicator.

17. The method according to claim 16 wherein the end message generated in step (c) includes an ending indicator and not a beginning indicator.

* * * * *